United States Patent Office 3,157,649
Patented Nov. 17, 1964

3,157,649
POTASSIUM DICHLOROISOCYANURATE
William F. Symes, Webster Groves, Mo., assignor to Monsanto Company, a corporation of Delaware
No Drawing. Filed Sept. 20, 1960, Ser. No. 57,129
10 Claims. (Cl. 260—248)

The present invention relates to potassium dichloroisocyanurate and particularly relates to physically stable, dry, free-flowing potassium dichloroisocyanurate compositions. The present invention further relates to processes for preparing compositions containing potassium dichloroisocyanurate as the major ingredient, which compositions are physically stable in that they will not coalesce or develop hard lumps to any appreciable extent. The term "physically stable" as used herein defines compositions which are essentially free-flowing and which do not tend to coalesce or form lumps under ordinary storage conditions, for prolonged periods, when prepared in accordance with the processess of the present invention.

It has been proposed heretofore, in various patent applications of which I have knowledge, to prepare potassium dichloroisocyanurate by a variety of procedures. For example, in one of these patent applications, it is disclosed that potassium dichloroisocyanurate may be prepared by directly chlorinating an aqueous solution of tripotassium cyanurate with gaseous chlorine wherein the gaseous chlorine is introduced into the tripotassium cyanurate solution (the solution being agitated to permit diffusion of the chlorine) at a rate sufficient to maintain a pH in the range of 6.0 to 8.5, thereby forming a slurry of potassium dichloroisocyanurate in the aqueous bulk of the reaction mixture which can be readily separated therefrom. Such procedure is described in greater detail in U.S. patent application, Serial No. 800,099, filed March 18, 1959, now abandoned, which is assigned to the same assignee as the present application. In still another patent application, it is disclosed that potassium dichloroisocyanurate may also be prepared, for example, by reacting two molecular proportions of trichloroisocyanuric acid and one molecular proportion of tripotassium cyanurate in an aqueous medium wherein the potassium dichloroisocyanurate again forms as a slurry in the aqueous bulk of the reaction mixture. The preparation of potassium dichloroisocyanurate by this method is described in pending U.S. patent application, Serial No. 807,285, filed April 20, 1959, now abandoned which is also assigned to the same assignee as the present application.

Potassium dichloroisocyanurate, prepared as described in the preceding paragraph, may occur in any of three crystalline forms or mixtures thereof, depending on the temperature of the aqueous medium at the time the potassium dichloroisocyanurate is formed as a slurry, in either or both of the above-described aqueous reaction mixtures. Generally, if such temperature is below about 52° C., crystalline potassium dichloroisocyanurate monohydrate is formed and if such temperature is above about 56° C., anhydrous crystalline potassium dichloroisocyanurate (hereinafter sometimes referred to, for convenience in description, as Form I potassium dichloroisocyanurate) is formed. On the other hand, where the temperature of the aqueous reaction medium is in the range of about 52° C. to about 56° C. a mixture of potassium dichloroisocyanurate monohydrate and anhydrous potassium dichloroisocyanurate is formed.

The crystals of potassium dichloroisocyanurate monohydrate are characterized in having internal and external symmetries each of which are triclinic while the crystals of anhydrous Form I potassium dichloroisocyanurate have internal and external symmetries each of which are monoclinic. However, it has been observed heretofore that potassium dichloroisocyanurate monohydrate will readily give up its water of hydration when heated at a temperature between about 100° C. and about 150° C. and that the product which results from such procedure is a pseudomorphic, crystalline, anhydrous potassium dichloroisocyanurate where the crystals have an internal symmetry which is monoclinic and an external symmetry which is triclinic. Stated differently, crystals of the dehydrated monohydrate retain the triclinic external symmetry of potassium dichloroisocyanurate monohydrate but during and after dehydration, assume the monoclinic internal symmetry of the Form I potassium dichloroisocyanurate which is originally formed in the anhydrous state. (The anhydrous potassium dichloroisocyanurate obtained from potassium dichloroisocyanurate monohydrate which has been dehydrated will be hereinafter referred to as pseudomorphic potassium dichloroisocyanurate and is sometimes referred to hereinafter, for convenience in description, as Form II potassium dichloroisocyanurate.)

Although potassium dichloroisocyanurate can be produced as the monohydrate, neither the Form I, nor the pseudomorphic or Form II potassium dichloroisocyanurate can be easily transformed into the monohydrate and these compounds are not transformed into the monohydrate by exposure to surface moisture. During normal production, potassium dichloroisocyanurate is almost always dried as either the Form I or the dehydrated pseudomorphic crystalline form (Form II) as a final step in the manufacturing process. Such dried potassium dichloroisocyanurate has certain distinct advantages over other chloroisocyanurate compounds, one of the more important being its relatively good stability to loss of available chlorine during shipping and storage and when incorporated in commercial detergent, bleaching, sanitizing and other formulations.

While either Form I or Form II potassium dichloroisocyanurate is suitable for incorporation in a wide variety of formulations, for example, in household laundry bleaches and detergents, hospital disinfectants, sterilizing compositions and the like, a high percentage of the dried and anhydrous or substantially anhydrous material as produced, coalesces and forms hard lumps or "solid cakes" in storage in metal and other containers under prolonged storage conditions of more than two months. In many instances the lumped or caked material can be removed only with difficulty from the containers and it is often necessary to reprocess it by heating and/or grinding before it can be incorporated in the above-mentioned formulations. Such reprocessing involves considerable cost, which cost is often further increased due to loss of some of the caked potassium dichloroisocyanurate which cannot be removed from the containers.

It is one object of the present invention to provide dry, free-flowing products comprising substantially potassium dichloroisocyanurate which products are not only suitable for a variety of uses as in the case of potassium dichloroisocyanurate per se, but are also physically stable for long periods of time.

It is a further object of the present invention to provide processes for preparing dry, free-flowing, potassium dichloroisocyanurate compositions containing certain anhydrous, crystalline, inorganic compounds which compositions are not only suitable for a variety of uses but which may be stored for periods of at least six months without appreciable coalescence or lump formation.

It is still a further object of the present invention to provide processes for preparing novel dry, free-flowing, potassium dichloroisocyanurate compositions containing certain anhydrous, hydratable, crystalline inorganic compounds which compositions are not only suitable for a variety of uses but will not appreciably coalesce or form lumps for periods of at least six months and which contain substantially the same percentage of available chlorine as potassium dichloroisocyanurate per se.

Other objects and advantages of this invention will become apparent from the following description and the appended claims.

It has presently been found that when a potassium dichloroisocyanurate which is at a temperature in the range of 100° C. to 150° C. is intimately admixed with a minor amount, insufficient to adversely affect the properties of said potassium dichloroisocyanurate, of a partially to completely anhydrous, hydratable, water soluble, non-deliquescent, crystalline inorganic compound having a rate of hydration greater than 160 milligrams percent per hour at a temperature of 25° C. and a relative humidity of 100%, there is provided a free-flowing potassium dichloroisocyanurate product which will not coalesce or form hard lumps to any appreciable extent even when stored for long periods of time, for example, from 2 to 18 months under conditions of high average ambient relative humidity, such as for example, an average ambient relative humidity of from 50% to 80%. The rate of hydration of the hydratable, crystalline, inorganic compounds is such that a 100 gram portion of such crystalline compound, having a certain range of crystalline size (hereinafter defined) will hydrate in the form of crystalline water of hydration to the extent of 160 milligrams in 1 hour under the aforedescribed temperature and humidity conditions.

The exact cause or reason for the coalescence or lump formation of potassium dichloroisocyanurate has not been definitely established. However, it has unexpectedly been found that when potassium dichloroisocyanurate compositions are prepared by the above-described process, such compositions not only remain physically stable when stored for prolonged periods of time but are also now more stable toward loss of available chlorine when the hydratable crystalline compounds are admixed with the potassium dichloroisocyanurate at a temperature in the range of 100° C. to 150° C., preferably 110° C. to 140° C., than potassium dichloroisocyanurate per se which has coalesced or formed lumps. Thus while the physical stability of potassium dichloroisocyanurate may be partially or somewhat improved by the addition of the aforementioned inorganic crystalline compounds to potassium dichloroisocyanurate under ambient temperature conditions, the compositions prepared by the process of the present invention are physically stable for periods of from 10 to 18 months when stored under humid atmospheric conditions, that is, conditions in which the ambient relative humidity varies between 60% and 80%, and potassium dichloroisocyanurate compositions prepared by the process of this invention are appreciably more stable toward loss of available chlorine than potassium dichloroisocyanurate per se which has coalesced or formed lumps.

It has also been unexpectedly found that substantially smaller amounts of the inorganic crystalline compounds are required to be admixed with potassium dichloroisocyanurate to prevent coalescence and lump formation therein when such inorganic crystalline compounds are admixed with potassium dichloroisocyanurate which is at a temperature in the range of 100° C. to 150° C., preferably a temperature between 110° C. and 140° C.

In determining whether or not a particular anhydrous, hydratable, water soluble, non-deliquescent, crystalline inorganic compound is suitable for incorporation in the potassium dichloroisocyanurate compositions as prepared by the processes of this invention, a 50 to 100 gram portion of such compound is usually standardized with respect to crystalline size and then spread out as a ⅛ inch thick layer in a flat container which is placed in a chamber having a temperature of 25° C. and a relative humidity of 100%. An aliquot of the compound is then generally weighed at 15 minute intervals for a period of 5 hours to ascertain the rate of hydration of such compound.

Compounds having a standardized crystalline size are usually obtained by passing the crystalline material successively through a No. 100 and a No. 200 standard mesh U.S. screen and thereafter using the material which is retained on the number 200 mesh screen in determining the rate of hydration of the compound. The rate of hydration may then be determined by adding the gains in weight, which total gain is generally at a constant rate for a period of more than 5 hours, over any of 4 consecutive 15 minute periods.

The crystalline inorganic compounds used in the processes of the present invention are thoroughly and intimately admixed at a temperature in the range of 100° C. to 150° C. with the substantially anhydrous Form I or Form II potassium dichloroisocyanurate by any suitable mechanical mixing device, such as for example, a bladed folding mixer such as a "Reed" mixer used in the baking industry, to insure a complete and intimate admixture. It is desirable that the size of the crystals of the crystalline inorganic compound be similar to the size of the crystals of the potassium dichloroisocyanurate into which the compound will be incorporated. The crystal size and crystal size distribution can vary considerably but is preferably such that between 70% and 80% by weight of the potassium dichloroisocyanurate and each inorganic crystalline compound and also the resulting potassium dichloroisocyanurate composition is retained on a number 325 mesh standard U.S. screen and less than 10%, preferably less than 5%, by weight is retained on a number 10 mesh standard U.S. screen. It is to be understood however that potassium dichloroisocyanurate and the inorganic crystalline compounds having a uniform particle size (such as, for example, 80 mesh particles, 100 mesh particles or 200 mesh particles) within the above described range are suitable for inclusion in the composition of this invention.

The crystalline inorganic compounds which are preferably used are compounds which also will not react, that is will not undergo an oxidation-reduction reaction with potassium dichloroisocyanurate when intimately admixed therewith.

In all essential respects the physical, chemical, and functional properties of the potassium dichloroisocyanurate (as freshly prepared) are not affected by the incorporation therein of the herein defined crystalline inorganic compounds in small amounts in accordance with the process of this invention. By contrast, anhydrous Form I or Form II potassium dichloroisocyanurates which do not contain these crystalline inorganic compounds, will, in most instances, coalesce and develop hard lumps or will cake under identical storage conditions, and when such a condition occurs the potassium dichloroisocyanurate is unsuitable for most commercial end uses unless it is reprocessed or comminuted.

Any partially to completely anhydrous, crystalline, inorganic compound having the aforedescribed properties may be admixed with potassium dichloroisocyanurate in the practice of the processes of the present invention. Examples of such compounds which may be admixed with potassium dichloroisocyanurate to form the above-mentioned compositions are certain alkali metal and alkaline earth metal salts having the aforedescribed properties, and included are certain alkali metal and alkaline earth metal phosphates, silicates, sulfates and carbonates such as, for example, sodium silicate, sodium sulfate, sodium carbonate and corresponding potassium and lithium salts; sodium tripolyphosphate and potassium tripolyphosphate as well as calcium carbonate, aluminum sulfate, aluminum carbonate and the like. Of the above inorganic compounds, sodium tripolyphosphate, sodium silicate and sodium carbonate are particularly preferred.

In making the compositions of this invention, the aforementioned crystalline inorganic compounds are preferably incorporated in dry particles of potassium dichloroisocyanurate which has not been stored for a sufficiently long period of time to coalesce or lump and which is at a temperature in the range of about 100° C. to 150° C. The amount of such inorganic compound employed should preferably be sufficient to prevent coalescence or lumping, but the amount used should not cause appreciable change in the properties of the potassium dichloroisocyanurate, particularly with respect to lessening the water solubility thereof or substantially decreasing the available chlorine content of the potassium dichloroisocyanurate. It has presently been found that from about 2.0% to about 10.0% by weight of such crystalline inorganic compound, based on the potassium dichloroisocyanurate, depending upon the particular compound used and the extent to which it is hydratable, can be intimately admixed with potassium dichloroisocyanurate to prevent the aforementioned coalescence and/or lump formation.

The crystalline inorganic compounds which are preferred in the practice of the present invention are certain partially to completely anhydrous alkali metal salts having properties as heretofore defined. The alkali metal salts which have presently been found to be particularly advantageous are sodium tripolyphosphate, sodium silicate having an $Na_2O$ to $SiO_2$ ratio of from 1:1 to 3:1, sodium sulfate and sodium carbonate, containing not more than 0.5% by weight of moisture as water of hydration. In a preferred process, from about 2.0 to 10% by weight preferably from 2% to 6% by weight of such salts or mixtures thereof are usually mixed with a potassium dichloroisocyanurate having the aforedefined crystalline size at a temperature in the range of 100° C. to 150° C. and containing not more than 0.3% by weight of moisture. By carrying out the processes of this invention, it is possible to provide physically stable, free-flowing potassium dichloroisocyanurate compositions which will remain free flowing and will not form lumps for from 2 to 18 months under storage conditions which are normally encountered in commercial operations. Such compositions are suitable for incorporation in bleaching, sterilizing and disinfectant compositions wherein they constitute the active oxidizing component thereof.

Other crystalline inorganic compounds, as hereinbefore defined and described, may be incorporated in potassium dichloroisocyanurate at the aforedefined temperature to form free flowing compositions which will not coalesce but the amount of any crystalline inorganic compound used preferably should not cause an appreciable change in the characteristics of potassium dichloroisocyanurate, particularly with respect to water solubility and available chlorine content. Also such inorganic compounds preferably should not undergo an oxidation-reduction reaction with potassium dichloroisocyanurate while in storage or when dissolved in water in an end use formulation.

The stabilized potassium dichloroisocyanurate compositions prepared by the processes of this invention are characterized in having an available chlorine content of about 53.1% to about 59.4%, depending upon the kind and amount of hydratable crystalline salt which is admixed therewith, in contrast to 60.08 percent available chlorine which is the theoretical available chlorine content of potassium dichloroisocyanurate per se. Such stabilized potassium dichloroisocyanurate compositions are further characterized in that they are uniform crystalline products wherein, when subjected to particle size measurement by standard screen analysis, less than 10%, preferably less than 5%, by weight is retainable on a number 10 mesh standard U.S. screen and between 70% and 80%, preferably 80% by weight is retainable on a number 325 mesh standard U.S. screen.

A further understanding of the compositions and processes of this invention will be obtained from the following specific examples which are intended to illustrate the invention but not to limit the scope thereof, parts and percentages being by weight unless otherwise specified.

EXAMPLE I

A crystalline potassium dichloroisocyanurate was employed having an internal monoclinic symmetry and an external triclinic symmetry, an available chlorine content of 59.6% and containing 0.2% moisture and the particle size distribution shown in the following table.

| Standard screen Nos.: | Material retained (percent) |
|---|---|
| +40 | 7.8 |
| −40+60 | 17.8 |
| −60+100 | 18.9 |
| −100+200 | 25.2 |
| −200+325 [1] | 8.2 |

[1] 22.1% of the material passed through the No. 325 mesh screen.

Using the above product, four potassium dichloroisocyanurate compositions were prepared by intimately and separately admixing the crystalline inorganic salts referred to below with the potassium dichloroisocyanurate product which was at a temperature of 120° C. during the mixing operation. Heat was withdrawn in each instance as the potassium dichloroisocyanurate was placed in a Reed mixer along with the particular crystalline inorganic salt. The ingredients were admixed for two hours during which time the mixture was slowly permitted to return to room temperature (i.e. 25° C.). All of the crystalline inorganic salts used had a particle size range comparable and similar to the particle size range of the potassium dichloroisocyanurate (e.g. about 8% of such salts were retained on a No. 40 Standard U.S. screen and 75% were retainable on a No. 325 mesh U.S. Standard screen and all such salts had a moisture content below 0.5% by weight). The formulae of these compositions and their available chlorine content are summarized as follows:

*Potassium Dichloroisocyanurate Compositions*

| Material | Composition Number | | | | |
|---|---|---|---|---|---|
| | 1 (percent) | 2 (percent) | 3 (percent) | 4 (percent) | 5 [1] (percent) |
| Potassium dichloroisocyanurate | 98.0 | 92.0 | 94.0 | 96.0 | 100.0 |
| Sodium tripolyphosphate | 2.0 | | | | |
| Sodium silicate $Na_2O$:$SiO_2$-1:1 | | 8.0 | | | |
| Sodium sulfate | | | 6.0 | | |
| Sodium carbonate | | | | 4.0 | |
| Available chlorine analysis | 59.4 | 54.9 | 56.0 | 57.2 | 59.6 |

[1] Control.

The above compositions were stored in ordinary closed metal containers in a regular storeroom under ambient conditions wherein the temperature varied between 60° F. and 90° F. and the relative humidity between 50% and 85% and were examined weekly for evidence of coalescence and lump formation as well as moisture and available chlorine content over a period of 36 weeks. After this period, compositions 1 through 4 appeared as dry, free-flowing products and showed no evidence of coalescence, lumping or caking. On the other hand, potassium dichloroisocyanurate per se (compositions No. 5) exhibited some lumping within three weeks and at the end of two months had coalesced into a hard mass.

Data concerning available chlorine and moisture content of each of compositions 1 through 5 as recorded initially and at the end of 36 weeks is summarized as follows:

| Composition Number | Initial | | After Storage (36 weeks) | |
|---|---|---|---|---|
| | Available Chlorine (percent) | Moisture (percent) | Available Chlorine (percent) | Moisture (percent) |
| 1 | 59.4 | 0.2 | 59.2 | [1] 0.2 |
| 2 | 54.9 | 0.3 | 54.3 | [1] 0.4 |
| 3 | 56.0 | 0.3 | 55.6 | [1] 0.4 |
| 4 | 57.2 | 0.3 | 56.5 | [1] 0.5 |
| 5 | 59.6 | 0.2 | 58.0 | [2] 0.3 |

[1] Composition free-flowing.
[2] Composition had coalesced into a solid cake.

A screen analysis of compositions 1 through 4 showed that the range in crystalline size of these compositions remained unchanged after 36 weeks. A screen analysis of composition 5 could not be made due to the fact that it was a large single lump.

Compositions identical to compositions 1 through 4 above were prepared by admixing the above-described inorganic crystalline salts with potassium dichloroisocyanurate at a temperature of about 25° C. When such compositions were stored and examined as described above, they remained stable and free-flowing for 18 weeks but thereafter exhibited some lump formation along with an increase in moisture content of from 0.2% to 0.3% by weight to 0.8% to 0.9% by weight after 36 weeks of storage. Also the available chlorine content of each of compositions 1 through 4 was slightly but significantly lower than compositions wherein the inorganic salts were admixed with potassium dichloroisocyanurate which was heated to a temperature of 120° C. as above described.

EXAMPLE II

A completely anhydrous crystalline potassium dichloroisocyanurate was employed having a monoclinic internal symmetry and a triclinic external symmetry and the same particle size distribution as that of the potassium dichloroisocyanurate of Example I.

Using this material, four potassium dichloroisocyanurate compositions were prepared using the hydrated inorganic salts and the process of Example I (wherein the potassium dichloroisocyanurate was heated to 120° C.) and the inorganic compounds of that example. The resultant products were analyzed, stored and examined as in Example I along with the anhydrous potassium dichloroisocyanurate per se.

As in Example I, the compositions appeared as dry, free-flowing products and showed no evidence of coalescence, lumping or caking after 36 weeks. On the other hand, the anhydrous potassium dichloroisocyanurate per se exhibited some lumping within three weeks and at the end of two months had coalesced into a hard mass.

Compositions identical to the above compositions of this example, except that they were prepared by admixing the inorganic salts with the potassium dichloroisocyanurate at a temperature of 25° C., remained stable for 18 weeks under the storage conditions of Example I but thereafter exhibited some lump formation along with an increase in moisture, (from 0.17 to 0.2% by weight to 0.8 to 0.9% by weight) after 36 weeks of storage. Also the available chlorine content of such compositions was slightly but significantly lower than the compositions wherein the inorganic salts were admixed with the anhydrous potassium dichloroisocyanurate employed in this example which had been heated to a temperature of 120° C. as heretofore described in Example I.

EXAMPLE III

The compositions of Example I and the procedures used in the preparation of these compositions were repeated except that the crystalline potassium dichloroisocyanurate used was characterized in having monoclinic internal and monoclinic external symmetries and contained 0.2% by weight of moisture, but otherwise had the particle size distribution of the product of Example I.

The results obtained were substantially the same as those obtained in Examples I and II, namely, compositions which had been prepared by admixing the inorganic compounds with the potassium dichloroisocyanurate which had been heated to a temperature of 120° C. remained free-flowing after 36 weeks of storage under the storage conditions of Example I. On the other hand, the potassium dichloroisocyanurate per se (of this example) and the compositions prepared by admixing the inorganic compounds with potassium dichloroisocyanurate at a temperature of 25° C. exhibited the coalescence and/or lump formation of the compositions of Example I.

When hydratable, water-insoluble, inorganic compounds such as calcium sulfate and magnesium silicate were admixed with the heated potassium dichloroisocyanurate in place of the sodium tripolyphosphate in composition number 1 in the above example, the resulting products, when stored as aforedescribed developed hard lumps, which were broken only with difficulty. Such compositions were caked along the walls of the container after two months storage and were quite similar in appearance to potassium dichloroisocyanurate per se (composition number 5) which was examined simultaneously with these compositions.

Non-hydratable, water-insoluble materials such as talc and fume silica (Cab-O-Sil) were admixed with heated potassium dichloroisocyanurate in place of sodium tripolyphosphate in composition 1 in the above example and the resulting products stored and evaluated as in that example. After two months of such storage these products had developed hard lumps and had coalesced along the sides of the containers in which they were stored. Materials such as talc and Cab-O-Sil are commonly used to prevent caking and lump formation in granular crystalline products but such materials were ineffectual in preventing coalescence and lump formation in potassium dichloroisocyanurate.

What is claimed is:

1. The process for making potassium dichloroisocyanurate particles which do not appreciably coalesce or lump during storage which comprises intimately admixing solid particles of potassium dichloroisocyanurate containing less than 0.3% by weight of moisture, at a temperature of about 100° C. to about 150° C. with from about 2% to about 10% by weight, based on the weight of said potassium dichloroisocyanurate, of solid particles of a partially to completely anhydrous hydratable, water soluble, non-deliquescent, crystalline, inorganic compound selected from the group consisting of alkali metal phosphates, silicates, carbonates and sulfates and having a rate of hydration greater than 160 milligrams percent per hour at a temperature of 25° C. and a relative humidity of 100% until a dry, stable, free flowing potassium dichloroisocyanurate product is formed, said product being characterized in having an available chlorine content of from about 53.1% to about 59.4%.

2. The process of claim 1 wherein the crystalline inorganic compound is sodium tripolyphosphate.

3. The process of claim 1 wherein the crystalline inorganic compound is sodium silicate.

4. The process of claim 1 wherein the crystalline inorganic compound is sodium carbonate.

5. The process for making potassium dichloroisocyanurate particles which do not appreciably coalesce or lump during storage which comprises heating crystalline potassium dichloroisocyanurate containing less than 0.3% by weight of moisture and having a monoclinic internal symmetry and a triclinic external symmetry to a temperature in the range of about 100° C. to about 150° C. and thereafter while maintaining said potassium dichloroisocyanurate at a temperature within said range intimately admixing with the crystalline potassium dichloroisocyanurate from about 2.0 to about 10.0% by weight based on the weight of said potassium dichloroisocyanurate of a hydratable, water soluble, non-deliquescent, crystalline inorganic compound selected from the group consisting of alkali metal phosphates, silicates, carbonates and sulfates and having a moisture content of not more than 5% by weight and having a rate of hydration greater than 160 milligrams percent per hour at a temperature of 25° C. and a relative humidity of 100% said crystalline compound being incapable of undergoing the oxidation reduction reaction with said potassium dichloroisocyanurate, thereby forming a stable free flowing product containing potassium dichloroisocyanurate and characterized in having an available chlorine content of from about 53.1% to about 59.4%.

6. The process for making potassium dichloroisocyanurate particles which do not appreciably coalesce or lump during storage which comprises heating crystalline potassium dichloroisocyanurate containing less than 0.3% by weight of moisture and characterized in having an internal monoclinic symmetry and an external triclinic symmetry and having a particle size in a range wherein less than 10% by weight is retained on a No. 10 mesh standard U.S. screen and between 70% and 80% by weight is retained on a No. 325 mesh standard U.S. screen and to a temperature in the range of between 110° C. and 140° C., and thereafter, while maintaining said potassium dichloroisocyanurate at a temperature within said range, intimately admixing with the crystalline potassium dichloroisocyanurate from about 3% to about 6% by weight based on the weight of said potassium dichloroisocyanurate of an hydratable, water-soluble, non-deliquescent, crystalline, inorganic compound selected from the group consisting of alkali metal phosphates, silicates, carbonates and sulfates having a moisture content of not more than 0.5% by weight and having a rate of hydration greater than 160 milligrams percent per hour at a temperature of 25° C. and a relative humidity of 100%; said inorganic compound being composed of particles which are within the particle size range of said potassium dichloroisocyanurate and being incapable of undergoing an oxidation reduction reaction with said potassium dichloroisocyanurate thereby forming a stable, free flowing, potassium dichloroisocyanurate product characterized in having an available chlorine content of from about 53.1% to about 59.4%.

7. The process of claim 6 wherein the crystalline inorganic compound is sodium sulfate.

8. The process of claim 6 wherein the crystalline inorganic compound is sodium tripolyphosphate.

9. The process of claim 6 wherein the crystalline inorganic compound is sodium silicate.

10. The process of claim 6 wherein the crystalline inorganic compound is sodium carbonate.

References Cited in the file of this patent

UNITED STATES PATENTS

| | | |
|---|---|---|
| 2,607,738 | Hardy | Aug. 19, 1952 |
| 2,897,154 | Low | July 28, 1958 |
| 2,913,460 | Brown et al. | Nov. 17, 1959 |
| 3,035,054 | Symes et al. | May 15, 1962 |

FOREIGN PATENTS

| | | |
|---|---|---|
| 219,930 | Australia | Jan. 22, 1959 |
| 593,737 | Canada | Mar. 1, 1960 |
| 607,971 | Canada | Nov. 1, 1960 |